United States Patent
Palin et al.

(10) Patent No.: US 8,879,993 B2
(45) Date of Patent: Nov. 4, 2014

(54) METHOD, APPARATUS, AND COMPUTER PROGRAM PRODUCT FOR WIRELESS SHORT-RANGE COMMUNICATION ESTABLISHMENT

(75) Inventors: Arto Palin, Viiala (FI); Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 351 days.

(21) Appl. No.: 13/435,085

(22) Filed: Mar. 30, 2012

(65) Prior Publication Data

US 2013/0260688 A1 Oct. 3, 2013

(51) Int. Cl.
*H04B 7/26* (2006.01)

(52) U.S. Cl.
USPC .......................... 455/41.2; 370/338

(58) Field of Classification Search
CPC ............................ H04W 84/18; H04M 1/7253
USPC ........................................................ 455/41.2
See application file for complete search history.

(56) References Cited

U.S. PATENT DOCUMENTS

| 7,463,644 B2 * | 12/2008 | Zhu et al. ....................... 370/445 |
| 7,826,428 B2 * | 11/2010 | Malik et al. .................... 370/331 |
| 8,174,997 B2 * | 5/2012 | Choi et al. ...................... 370/252 |
| 8,254,878 B2 * | 8/2012 | Howard et al. ............. 455/404.2 |
| 8,422,954 B2 * | 4/2013 | Howard et al. ............. 455/41.2 |
| 8,570,277 B2 * | 10/2013 | Rekimoto ....................... 345/173 |
| 8,639,229 B2 * | 1/2014 | Apfel et al. .................... 455/416 |
| 8,725,080 B2 * | 5/2014 | Stankovska et al. ......... 455/63.1 |
| 2003/0228846 A1 * | 12/2003 | Berliner et al. ............ 455/67.11 |
| 2006/0046709 A1 * | 3/2006 | Krumm et al. ............. 455/422.1 |
| 2007/0201421 A1 * | 8/2007 | Huseth .......................... 370/338 |
| 2008/0018614 A1 * | 1/2008 | Rekimoto ..................... 345/173 |
| 2008/0144493 A1 * | 6/2008 | Yeh ................................ 370/230 |
| 2009/0017799 A1 * | 1/2009 | Thorn ......................... 455/414.1 |
| 2009/0092111 A1 * | 4/2009 | Horn et al. .................... 370/338 |
| 2009/0147697 A1 * | 6/2009 | Malik et al. ................... 370/254 |
| 2009/0212997 A1 * | 8/2009 | Michalski .................... 342/137 |
| 2010/0144274 A1 | 6/2010 | McDowall et al. |
| 2010/0191593 A1 * | 7/2010 | Wang et al. ............... 705/14.27 |
| 2010/0246419 A1 * | 9/2010 | Batta et al. .................... 370/252 |
| 2011/0140883 A1 | 6/2011 | Yamashita |
| 2011/0195701 A1 * | 8/2011 | Cook et al. ................. 455/422.1 |
| 2011/0211481 A1 * | 9/2011 | Ding et al. .................... 370/252 |
| 2011/0212699 A1 * | 9/2011 | Howard et al. ............ 455/404.1 |
| 2011/0221634 A1 * | 9/2011 | Libby et al. .................. 342/451 |

(Continued)

FOREIGN PATENT DOCUMENTS

WO   WO2004038938   5/2004

OTHER PUBLICATIONS

International Search Report for International Application No. PCT/FI2013/050085 mailed May 13, 2013.

*Primary Examiner* — Hai V Nguyen
(74) *Attorney, Agent, or Firm* — Locke Lord LLP

(57) ABSTRACT

Method, apparatus, and computer program product example embodiments enable devices to initiate a communication connection. In an example embodiment, a method includes receiving one or more device detection messages at an apparatus; transmitting, by the apparatus, one or more response messages including information usable for a wireless device receiving the one or more response messages to estimate a distance to the apparatus; and receiving, at the apparatus, a reverse response message including an information message from the wireless device, containing information usable for estimating a distance between the apparatus and the wireless device.

24 Claims, 13 Drawing Sheets

(56) References Cited

U.S. PATENT DOCUMENTS

| | | | |
|---|---|---|---|
| 2011/0223937 A1* | 9/2011 | Leppanen et al. | 455/456.2 |
| 2012/0003932 A1* | 1/2012 | Zhodzishsky | 455/41.2 |
| 2012/0244880 A1* | 9/2012 | Lee et al. | 455/456.1 |
| 2012/0295545 A1* | 11/2012 | Howard et al. | 455/41.2 |
| 2012/0300708 A1* | 11/2012 | Gast | 370/328 |
| 2013/0010617 A1* | 1/2013 | Chen et al. | 370/252 |
| 2013/0095868 A1* | 4/2013 | Salsbury et al. | 455/500 |
| 2013/0157573 A1* | 6/2013 | Aldaz et al. | 455/41.2 |
| 2013/0250931 A1* | 9/2013 | Abraham et al. | 370/338 |
| 2013/0273938 A1* | 10/2013 | Ng et al. | 455/456.1 |
| 2013/0281021 A1* | 10/2013 | Palin et al. | 455/41.2 |
| 2013/0283351 A1* | 10/2013 | Palin et al. | 726/4 |
| 2013/0324081 A1* | 12/2013 | Gargi et al. | 455/411 |
| 2014/0057610 A1* | 2/2014 | Olincy et al. | 455/414.1 |
| 2014/0135052 A1* | 5/2014 | Apfel et al. | 455/519 |
| 2014/0194062 A1* | 7/2014 | Palin et al. | 455/41.2 |
| 2014/0206286 A1* | 7/2014 | Palin et al. | 455/41.2 |

* cited by examiner

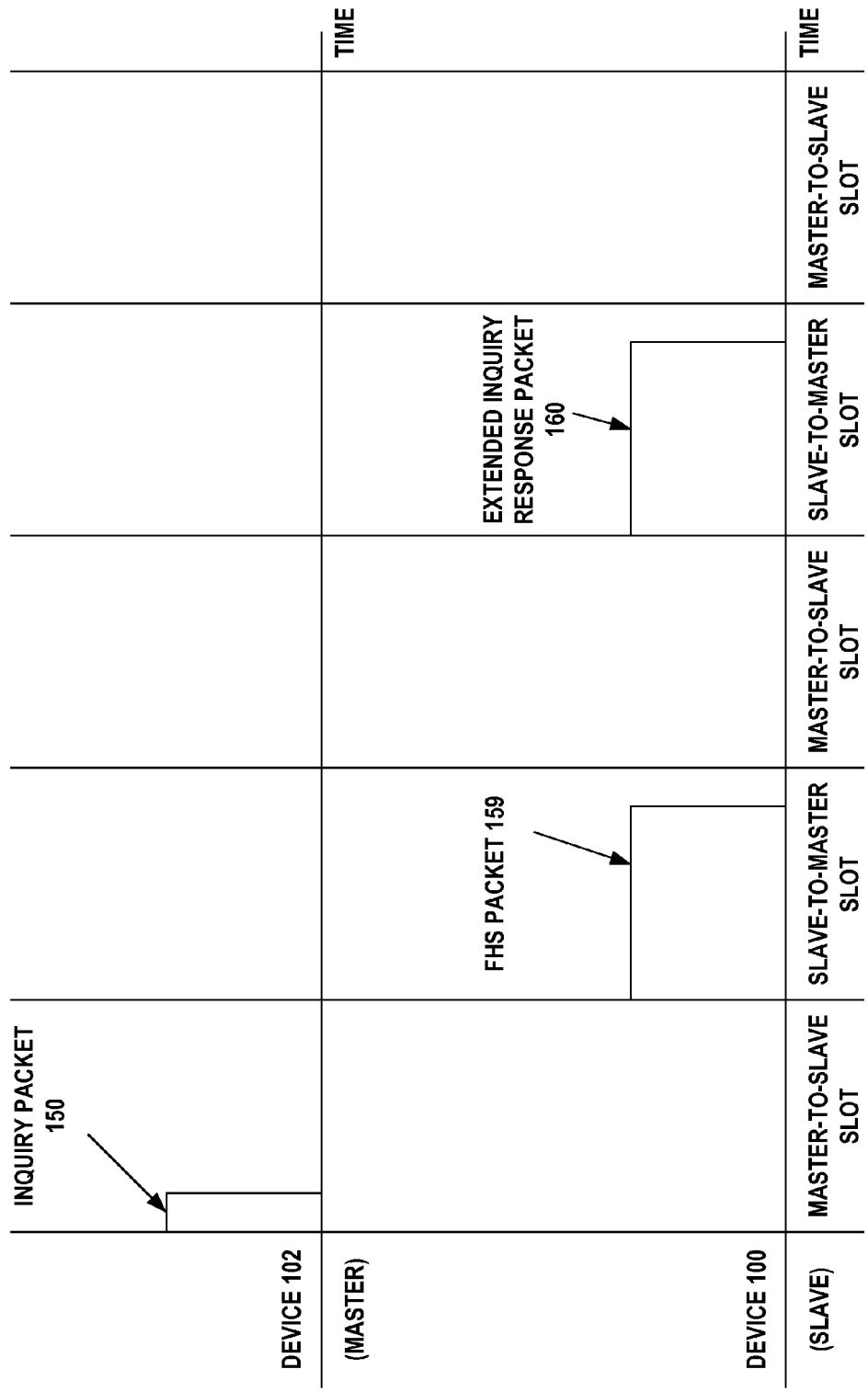

TIMING DURING THE BIDIRECTIONAL RESPONSE OPERATION, FOR EXAMPLE AS APPLIED IN BLUETOOTH TECHNOLOGY

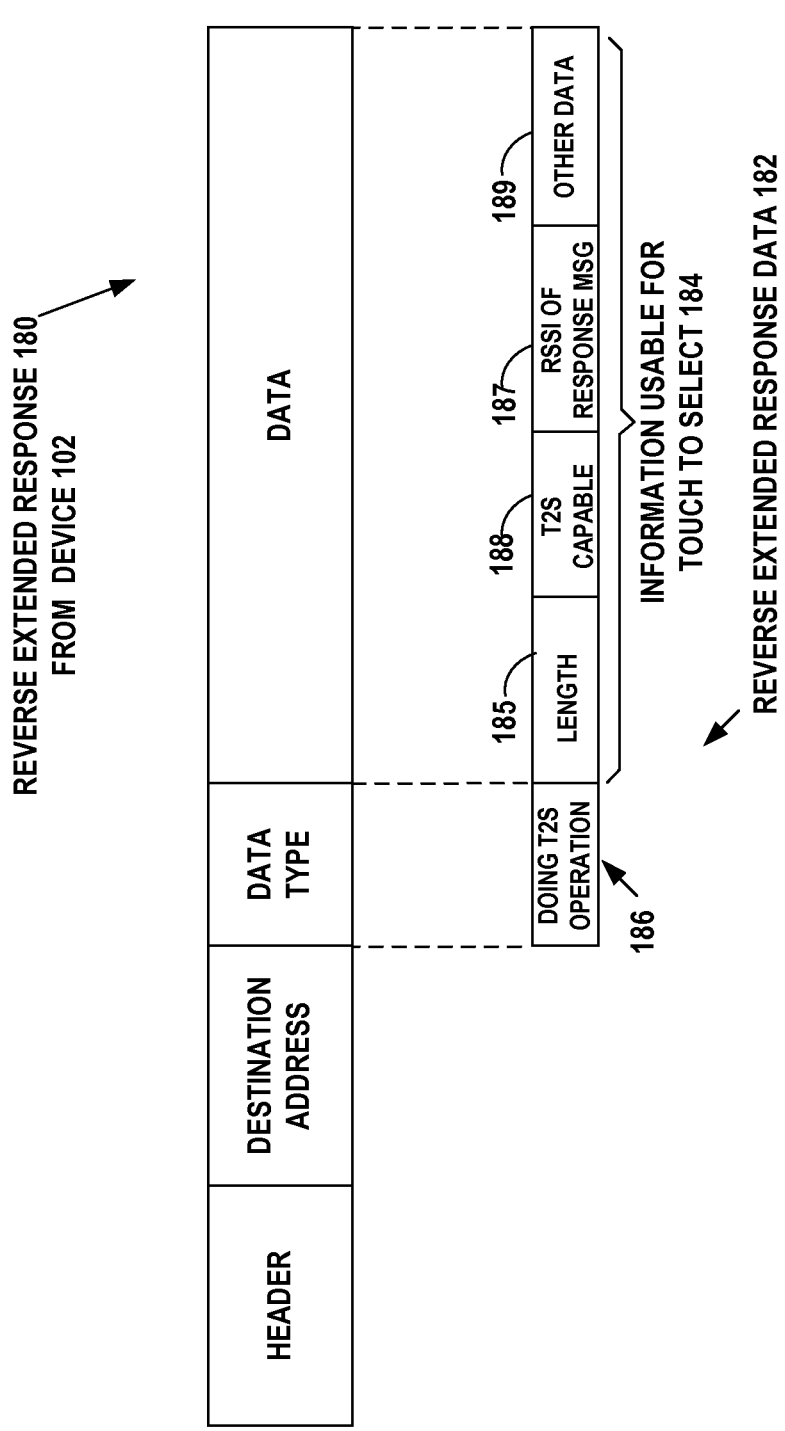

RECEPTION MODE IN ONE EXAMPLE EMBODIMENT APPLIED TO BLUETOOTH TECHNOLOGY

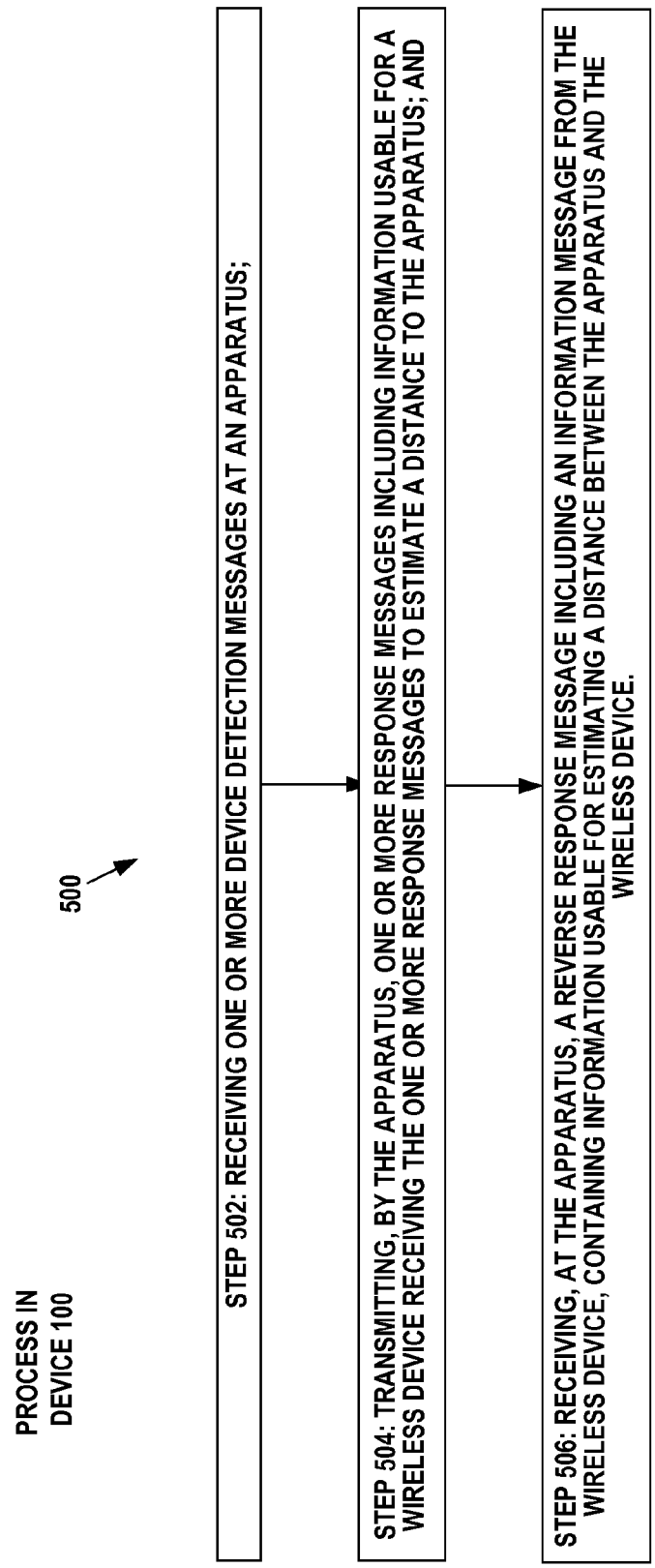

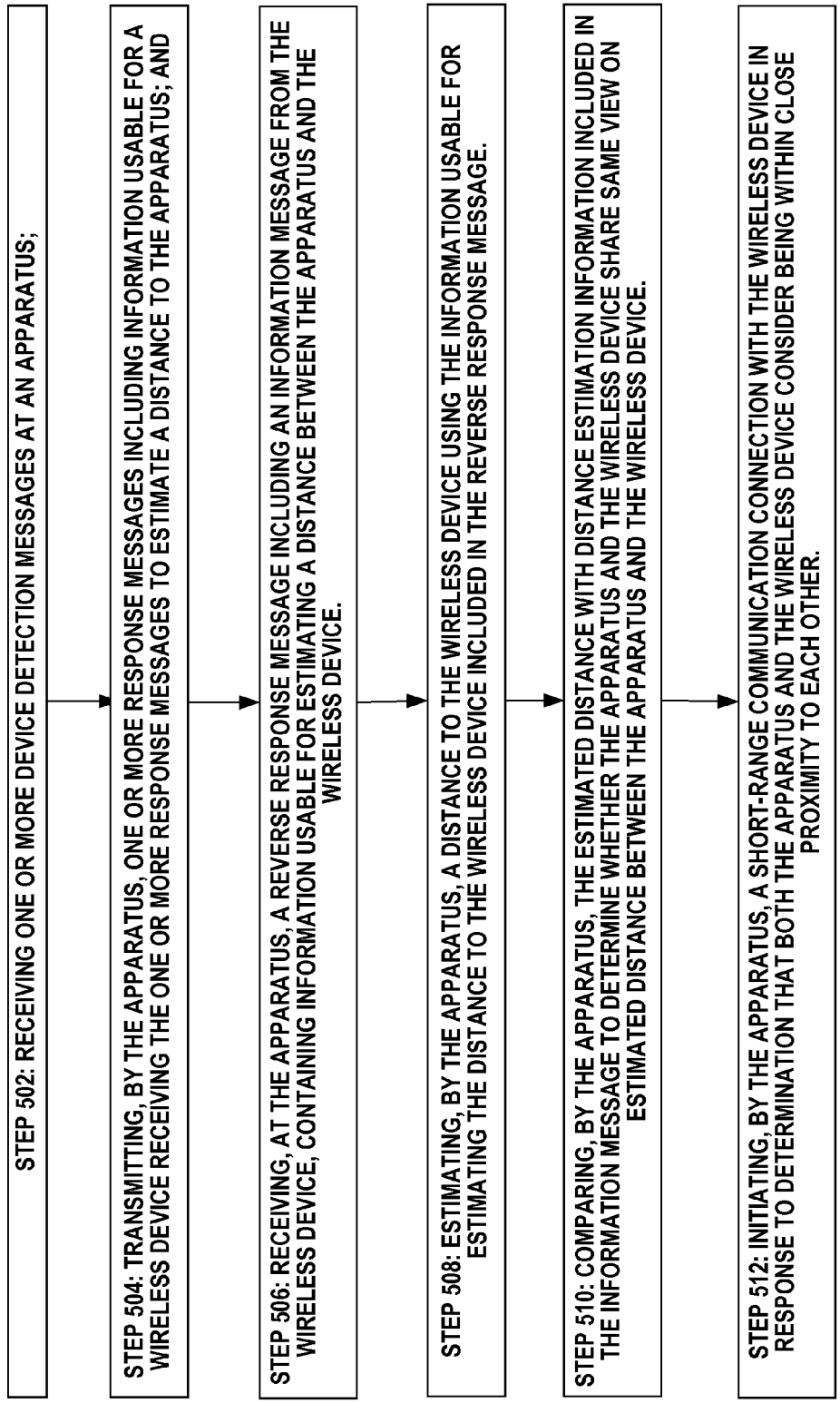

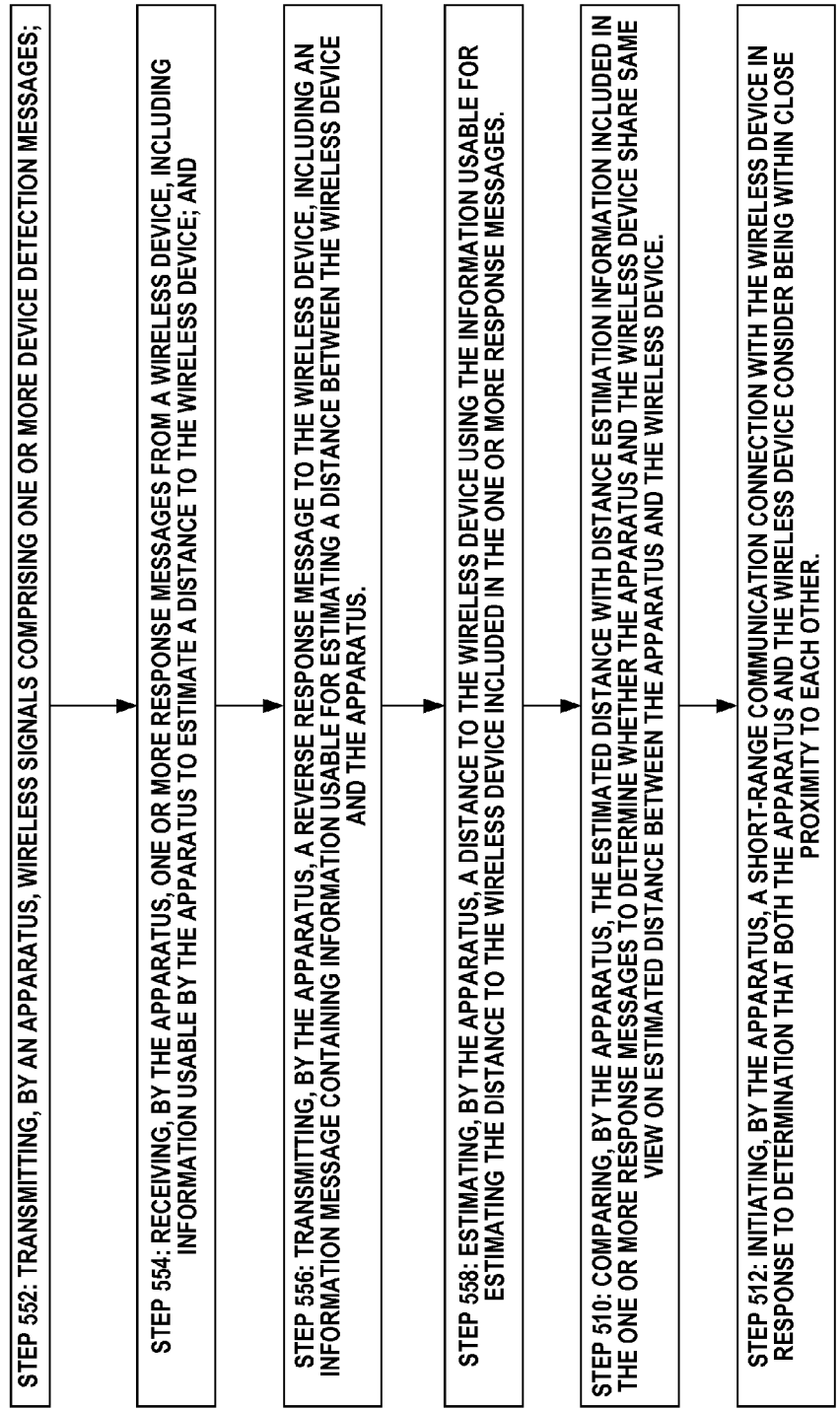

FIG. 5D  PROCESS IN DEVICE 102  550'

STEP 552: TRANSMITTING, BY AN APPARATUS, WIRELESS SIGNALS COMPRISING ONE OR MORE DEVICE DETECTION MESSAGES;

STEP 554: RECEIVING, BY THE APPARATUS, ONE OR MORE RESPONSE MESSAGES FROM A WIRELESS DEVICE, INCLUDING INFORMATION USABLE BY THE APPARATUS TO ESTIMATE A DISTANCE TO THE WIRELESS DEVICE; AND

STEP 556: TRANSMITTING, BY THE APPARATUS, A REVERSE RESPONSE MESSAGE TO THE WIRELESS DEVICE, INCLUDING AN INFORMATION MESSAGE CONTAINING INFORMATION USABLE FOR ESTIMATING A DISTANCE BETWEEN THE WIRELESS DEVICE AND THE APPARATUS.

STEP 558: ESTIMATING, BY THE APPARATUS, A DISTANCE TO THE WIRELESS DEVICE USING THE INFORMATION USABLE FOR ESTIMATING THE DISTANCE TO THE WIRELESS DEVICE INCLUDED IN THE ONE OR MORE RESPONSE MESSAGES.

STEP 510: COMPARING, BY THE APPARATUS, THE ESTIMATED DISTANCE WITH DISTANCE ESTIMATION INFORMATION INCLUDED IN THE ONE OR MORE RESPONSE MESSAGES TO DETERMINE WHETHER THE APPARATUS AND THE WIRELESS DEVICE SHARE SAME VIEW ON ESTIMATED DISTANCE BETWEEN THE APPARATUS AND THE WIRELESS DEVICE.

STEP 512: INITIATING, BY THE APPARATUS, A SHORT-RANGE COMMUNICATION CONNECTION WITH THE WIRELESS DEVICE IN RESPONSE TO DETERMINATION THAT BOTH THE APPARATUS AND THE WIRELESS DEVICE CONSIDER BEING WITHIN CLOSE PROXIMITY TO EACH OTHER.

METHOD, APPARATUS, AND COMPUTER PROGRAM PRODUCT FOR WIRELESS SHORT-RANGE COMMUNICATION ESTABLISHMENT

FIELD

The technology field relates to wireless short-range communication establishment.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. Bluetooth™ *Specification version 2.0+EDR*, published Oct. 15, 2004 has the original functional characteristics of the first version Bluetooth™ Basic Rate (BR) and adds the Enhanced Data Rate (EDR) feature. Bluetooth™ *Specification version 2.1+EDR*, published Jul. 26, 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. Bluetooth™ *Specification version 3.0+HS*, published Apr. 21, 2009, updated the standard to integrate the Alternate MAC/PHY and Unicast Connectionless Data features.

The Bluetooth™ *Core Specification, Version* 4.0, Bluetooth™ SIG, Jun. 30, 2010 (incorporated herein by reference), includes the Extended Inquiry Response. An Extended Inquiry Response may be used to provide miscellaneous information during the inquiry response procedure. Data types may be defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information.

SUMMARY

Method, apparatus, and computer program product example embodiments enable devices to initiate a communication connection.

An example embodiment of the invention includes a method comprising:

receiving one or more device detection messages at an apparatus;

transmitting, by the apparatus, one or more response messages including information usable for a wireless device receiving the one or more response messages to estimate a distance to the apparatus; and receiving, at the apparatus, a reverse response message including an information message from the wireless device, containing information usable for estimating a distance between the apparatus and the wireless device.

An example embodiment of the invention includes a method comprising:

wherein the information message includes a value that signifies that the wireless device sending the information message is capable of receiving and using the information usable for estimating the distance to the apparatus.

An example embodiment of the invention includes a method comprising:

estimating, by the apparatus, a distance to the wireless device using the information usable for estimating the distance to the wireless device included in the reverse response message.

An example embodiment of the invention includes a method comprising:

comparing, by the apparatus, the estimated distance with distance estimation information included in the information message to determine whether the apparatus and the wireless device share same view on estimated distance between the apparatus and the wireless device.

An example embodiment of the invention includes a method comprising:

wherein the distance estimation information included in the information message includes at least one of a RSSI information corresponding the estimated distance between the apparatus and the wireless device and an indication that the apparatus and the wireless device are in close proximity with each other.

An example embodiment of the invention includes a method comprising:

initiating, by the apparatus, a short-range communication connection with the wireless device in response to determination that both the apparatus and the wireless device consider being within close proximity to each other.

An example embodiment of the invention includes a method comprising:

transmitting, by an apparatus, wireless signals comprising one or more device detection messages;

receiving, by the apparatus, one or more response messages from a wireless device, including information usable by the apparatus to estimate a distance to the wireless device; and transmitting, by the apparatus, a reverse response message to the wireless device, including an information message containing information usable for estimating a distance between the wireless device and the apparatus.

An example embodiment of the invention includes a method comprising:

wherein the information message includes a value that signifies that the apparatus is capable of receiving and using the information usable for estimating the distance to the apparatus.

An example embodiment of the invention includes a method comprising:

estimating, by the apparatus, a distance to the wireless device using the information usable for estimating the distance to the wireless device included in the one or more response messages.

An example embodiment of the invention includes a method comprising:

comparing, by the apparatus, the estimated distance with distance estimation information included in the one or more response messages to determine whether the apparatus and the wireless device share same view on estimated distance between the apparatus and the wireless device.

An example embodiment of the invention includes a method comprising:

initiating, by the apparatus, a short-range communication connection with the wireless device in response to determination that both the apparatus and the wireless device consider being within close proximity to each other.

An example embodiment of the invention includes an apparatus comprising:

at least one processor;

at least one memory including computer program code;

the at least one memory and the computer program code configured to, with the at least one processor, cause the apparatus at least to:

receive one or more device detection messages;

transmit one or more response messages including information usable for a wireless device receiving the one or more response messages to estimate a distance to the apparatus; and receive a reverse response message including an information message from the wireless device, containing information usable for estimating a distance between the apparatus and the wireless device.

An example embodiment of the invention includes an apparatus comprising:

wherein the information message includes a value that signifies that the wireless device sending the information message is capable of receiving and using the information usable for estimating the distance to the apparatus.

An example embodiment of the invention includes an apparatus comprising:

the at least one memory and the computer program code configured to, with the at least one processor, cause the apparatus at least to:

estimate a distance to the wireless device using the information usable for estimating the distance to the wireless device included in the reverse response message.

An example embodiment of the invention includes an apparatus comprising:

the at least one memory and the computer program code configured to, with the at least one processor, cause the apparatus at least to:

compare the estimated distance with distance estimation information included in the information message to determine whether the apparatus and the wireless device share same view on estimated distance between the apparatus and the wireless device.

An example embodiment of the invention includes an apparatus comprising:

wherein the distance estimation information included in the information message includes at least one of a RSSI information corresponding the estimated distance between the apparatus and the wireless device and an indication that the apparatus and the wireless device are in close proximity with each other.

An example embodiment of the invention includes an apparatus comprising:

the at least one memory and the computer program code configured to, with the at least one processor, cause the apparatus at least to:

initiate a short-range communication connection with the wireless device in response to determination that both the apparatus and the wireless device consider being within close proximity to each other.

An example embodiment of the invention includes an apparatus comprising:

at least one processor;

at least one memory including computer program code;

the at least one memory and the computer program code configured to, with the at least one processor, cause the apparatus at least to:

transmit wireless signals comprising one or more device detection messages;

receive one or more response messages from a wireless device, including information usable by the apparatus to estimate a distance to the wireless device; and transmit a reverse response message to the wireless device, including an information message containing information usable for estimating a distance between the wireless device and the apparatus.

An example embodiment of the invention includes an apparatus comprising:

wherein the information message includes a value that signifies that the apparatus is capable of receiving and using the information usable for estimating the distance to the apparatus.

An example embodiment of the invention includes an apparatus comprising:

the at least one memory and the computer program code configured to, with the at least one processor, cause the apparatus at least to:

estimate a distance to the wireless device using the information usable for estimating the distance to the wireless device included in the one or more response messages.

An example embodiment of the invention includes an apparatus comprising:

the at least one memory and the computer program code configured to, with the at least one processor, cause the apparatus at least to:

compare the estimated distance with distance estimation information included in the one or more response messages to determine whether the apparatus and the wireless device share same view on estimated distance between the apparatus and the wireless device.

An example embodiment of the invention includes an apparatus comprising:

the at least one memory and the computer program code configured to, with the at least one processor, cause the apparatus at least to:

initiate a short-range communication connection with the wireless device in response to determination that both the apparatus and the wireless device consider being within close proximity to each other An example embodiment of the invention includes a computer program product comprising computer executable program code recorded on a computer readable, non-transitory storage medium, the computer executable program code comprising:

code for receiving one or more device detection messages at an apparatus;

code for transmitting, by the apparatus, one or more response messages including information usable for a wireless device receiving the one or more response messages to estimate a distance to the apparatus; and code for receiving, at the apparatus, a reverse response message including an information message from the wireless device, containing information usable for estimating a distance between the apparatus and the wireless device.

An example embodiment of the invention includes a computer program product comprising computer executable program code recorded on a computer readable, non-transitory storage medium, the computer executable program code comprising:

code for transmitting, by an apparatus, wireless signals comprising one or more device detection messages;

code for receiving, by the apparatus, one or more response messages from a wireless device, including information usable by the apparatus to estimate a distance to the wireless device; and code for transmitting, by the apparatus, a reverse response message to the wireless device, including an information message containing information usable for estimating a distance between the wireless device and the apparatus.

DESCRIPTION OF THE FIGURES

FIG. 2A is an illustration of an example embodiment of the invention, of the example timing during a device detection process, for example a Bluetooth inquiry process, in accordance with at least one embodiment of the present invention.

FIG. 3 is an illustration of an example embodiment of the invention, illustrating a reverse extended response packet transmitted from device 102, for example as applied in a modified Bluetooth extended inquiry response, in accordance with at least one embodiment of the present invention.

FIG. 5A is an illustration of an example embodiment of the invention, of the example process in the device 100, in accordance with at least one embodiment of the present invention.

FIG. 5B is an illustration of an example embodiment of the invention, of an example process in the device 100, in accordance with at least one embodiment of the present invention.

FIG. 5D is an illustration of an example embodiment of the invention, of the example process in the device 102, in accordance with at least one embodiment of the present invention.

DISCUSSION OF EXAMPLE EMBODIMENTS OF THE INVENTION

Figure 1A:
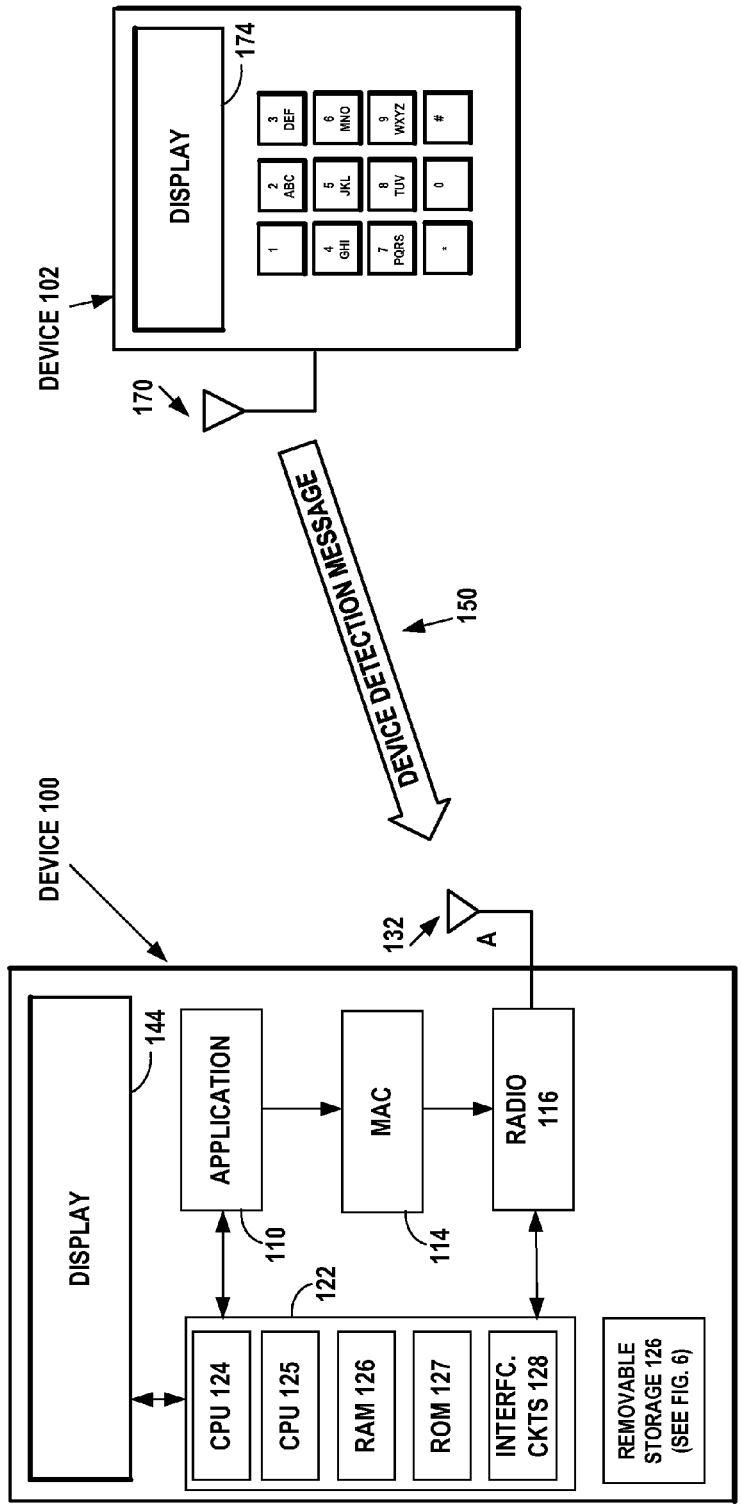
FIG. 1A is an illustration of an example embodiment of the invention, of an example network with a first device 100 scanning for one or more device detection messages from a second device 102, in accordance with at least one embodiment of the present invention.

This section is organized into the following topics:
A. Wireless Short-Range Communication Networks
B. Connection Formation Between Bluetooth™ Devices
C. Bluetooth Bidirectional Extended Inquiry Response
D. Touch to Select in Bluetooth Technology
E. Wireless Short-Range Communication Establishment
A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), Wireless Universal Serial Bus (WUSB), Ultra Wide-band (UWB), Zig-Bee (IEEE 802.15.4, IEEE 802.15.4a), and near field communication technologies, such as radio frequency identification (RFID) and near field communication (NFC) technology that enable contactless identification and interconnection of wireless devices. Bluetooth Technology provides an example of wireless short-range communication establishment.

B. Connection Formation Between Bluetooth™ Devices

A procedure for forming connections between Bluetooth™ devices is described in the Bluetooth™ *Specification*, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation includes inquiry, inquiry scanning, inquiry response, paging, page scanning, and page response procedures.

1. Inquiry

Inquiry is a procedure where a Bluetooth™ device transmits inquiry messages and listens for responses in order to discover the other Bluetooth™ devices that are within the coverage area. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over a total bandwidth of 80 MHz divided into 79 physical channels of 1 MHz each. An inquiring device wanting to discover other devices repetitively probes a first set of 16 frequencies, probing two frequencies every 625 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the inquiring device or master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. The inquiry response is optional: a device is not forced to respond to an inquiry message. During the inquiry substate, the discovering device collects the Bluetooth™ device addresses and clocks of all devices that respond to the inquiry message. In addition, the discovering device also collects extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and 63 values have been reserved as dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels changes the inquiry channel every 1.28 s until it receives an inquiry message on a the current channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval may be less than or equal to 2.56 s.

2. Inquiry Response

An inquiry response packet (FHS) is transmitted from the inquiry scanning device or slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeros the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28 s MAX_RAND may be as small as 127. A profile that uses a DIAC may choose to use a smaller MAX_RAND than 1023 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) packet with type DM1, DM3, DM5, DH1, DH3 or DH5. To minimize interference it is recommended to use the shortest packet that is capable of containing the data. The packet is sent on the same frequency as the FHS packet, 1250 microseconds after the start of the FHS packet. In the packet header, LT_ADDR may be set to zero. TYPE may be one of DM1, DM3, DM5, DH1, DH3 or DH5. FLOW, ARQN and SEQN may all be set to zero and ignored during receipt. The HEC LFSR may be initialized with the same DCI (default check initialization) as for the FHS packet. In the payload header, LLID may contain the value 10 (start of an L2CAP message or no fragmentation). FLOW may be set to zero and ignored upon receipt. The length of the payload body (LENGTH) may be smaller than or equal to 240 bytes. The CRC LFSR may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all IACs.

4. Page

Page is the initial phase of the connection procedure where a device transmits a train of page messages until a response is received from the target device or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address and the clock of the slave device. In the paging procedure, one the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

C. Bluetooth Bidirectional Extended Inquiry Response

The bidirectional extended inquiry response process for Bluetooth is an optional message delivered by a Bluetooth inquirer (master) device to a Bluetooth discoverable (slave) device, the inquirer responding to the slave's Extended Inquiry Response (EIR) message with its own Reverse Extended Inquiry Response (Reverse EIR) message in reply. The format of the Reverse EIR message may be the same as or a modified version of the EIR. This allows an inquirer device to provide information to other devices without forming an Asynchronous Connection-oriented Logical (ACL) connection. Different types of information may be provided in the message, as in the following examples:

Short application specific data
Inquirer BD address
Inquirer's attributes (Reverse EIR)

A benefit of this Reverse Extended Inquiry Response feature is to allow the delivery of short application messages by a server device without requiring an ACL connection setup. This may be important in situations where many devices are scanning for inquiry packets from a server device offering a specific service, where the scanning device replies to the server's inquiry with an EIR packet. Where the server then responds with a Reverse Extended Inquiry Response, the scanning device may gather sufficient information to know whether or not to proceed forming a connection, without expending the additional time and energy performing a page scan.

D. Touch to Select in Bluetooth Technology

The Bluetooth Touch to Select feature employs Received Signal Strength Indication (RSSI) information calculated from the FHS packet, which is used in determining that a device is within "touch range", i.e. proximate or in close proximity of the Inquiring device, and when a threshold for that close proximity is met. This provides an "intent to share" or "touch to connect" feature.

The inquiring device may measure the signal strength (e.g., RSSI) of each response message, which may be used in ordering the responding devices. In this manner, the device with the highest measured signal strength is listed first (e.g., wherein the measured signal strength may correlate to the distance between the inquiring device and the responding devices). However, the measurement may be limited to the first time the response message was received (e.g., since only one response is reported for each device), and thus, the listing may be inaccurate for moving devices. Further, it may happen that, due to the irregularities in the wireless communication medium, the signal strengths of a single transmission might provide false results.

As a further example, the user interface of the device may be used to indicate or guide the maximum field strength for the user in response to detecting a threshold condition in some wireless connection. This may be used where the user interface may be in the form of a display, a vibration, or the like. This may help in the touch to select process, to lower a RSSI threshold to avoid false touch detection. However, this solution may not provide adequate reliability since there are two dependencies in measuring radio signal strength: [1] antenna location of the device sending the signal and [2] antenna location of the device sensing the signal. The results may be improved if the antennas were brought into close proximity, which may require moving away from obstructions and changing the orientation of one or both devices.

E. Wireless Short-Range Communication Establishment

An example embodiment of the invention enables Bluetooth™ devices to initiate a communication connection. An inquiring Bluetooth™ device transmits one or more reverse response messages to a Bluetooth™ inquiry scanning device, including an information message containing information usable to the inquiry scanning device for estimating a touching or proximate distance to the inquiring device. The reverse response message includes a Bluetooth™ extended inquiry response packet that includes a data type indication to inform the inquiry scanning device that the inquiring device is capable of receiving and using information usable for estimating a touching or proximate distance. The reverse response message includes RSSI information to enable the inquiry scanning device to estimate the distance to the inquiring device. In response to receiving the reverse response message including the second information message, inquiry scanning device may perform at least one of initiating a faster inquiry scan interval, initiating a larger inquiry scan window, guiding a user for touch-to-select functionality, and activating a user interface to indicate proximity to the wireless device. The reverse response message may including information usable for indicating an angle of arrival of signals previously sent by the inquiry scanning device to the inquiring device, to enable a user of the inquiry scanning device to reposition the device to improve reception, in accordance with at least one embodiment of the present invention.

FIG. 1A is an illustration of an example embodiment of the invention, of an example network with a first device 100 scanning for one or more device detection messages from a second device 102, in accordance with at least one embodiment of the present invention. The following is one example embodiment applied to Bluetooth technology.

FIG. 1A is an illustration of an example embodiment of the invention, of an example network with a first Bluetooth™ device 100 scanning for one or more inquiry messages 150 from a second Bluetooth™ device 102, in accordance with at least one embodiment of the present invention. In embodiments of the invention, the inquiry scanning device 100 includes a processor 122, which includes from one to many central processing units (CPUs) 124 and 125, a random access memory (RAM) 126, a read only memory (ROM) 127, and interface circuits 128 to interface with one or more radio transceivers 116, battery or house power sources, keyboard, display 144, etc. The RAM and ROM can be removable memory devices such as smart cards, SIMs, WIMs, semiconductor memories such as RAM, ROM, PROMS, flash memory devices, etc. The processor 122 in the inquiry scanning device 100 outputs data to the Bluetooth™ MAC 114 that packages the data into Bluetooth™ protocol data units (PDU) or packets, such as FHS packets, inquiry response packets, and extended inquiry response packets that are input to the Bluetooth™ PHY radio 116 for normal Bluetooth™ transmission. During normal Bluetooth™ transmission, the RF signal from the radio 116 is directed to the antenna A 132 for transmission. The antenna may be an antenna array and is not limited to one, but may be any number suitable for the functions to be performed by embodiments of the invention.

When creating a connection with a short range radio relying on for example on RSSI level information, the threshold level may be set to such a low level that device that is not in close proximity may not be connected. But, on the other hand, connectivity should be reliable enough when device is in the close proximity. The field strength attenuates rapidly in close proximity and depends on the positioning of the two devices. The radio signal field may be described as an umbrella or a balloon around the device that originates from the antenna. Thus, setting a threshold value must be done with precision and tradeoffs may need to be made between detection probability and the number of false detections.

The signal strength may be affected on how the user holds the device. If the position of the device blocks the signal, the strength is even more attenuated and selection might become uncertain.

Antenna locations may vary from device to device based on constraint design, miniaturization, and other design factors, so that some antennas are usually in a better position than others. Usually, in the mobile phones, cellular antennas are located in the areas that are not blocked by user's hand in the normal usage.

Inquiry scanning device 100 and inquiring device 102 may be, for example, a miniature device such as a key fob, smart card, jewelry, or the like. Inquiry scanning device 100 and inquiring device 102 may be, for example, a relatively larger cell phone, smart phone, flip-phone, PDA, graphic pad, or even larger devices such as a laptop computer, desktop computer, kitchen appliance, such as a refrigerator, an automobile dashboard, and the like. In embodiments, the relative sizes of devices 100 and 102 may be arbitrary, either one of the devices may be either mobile or fixed-base, and the device 102 may have either a single antenna or an antenna array.

Figure 1B:
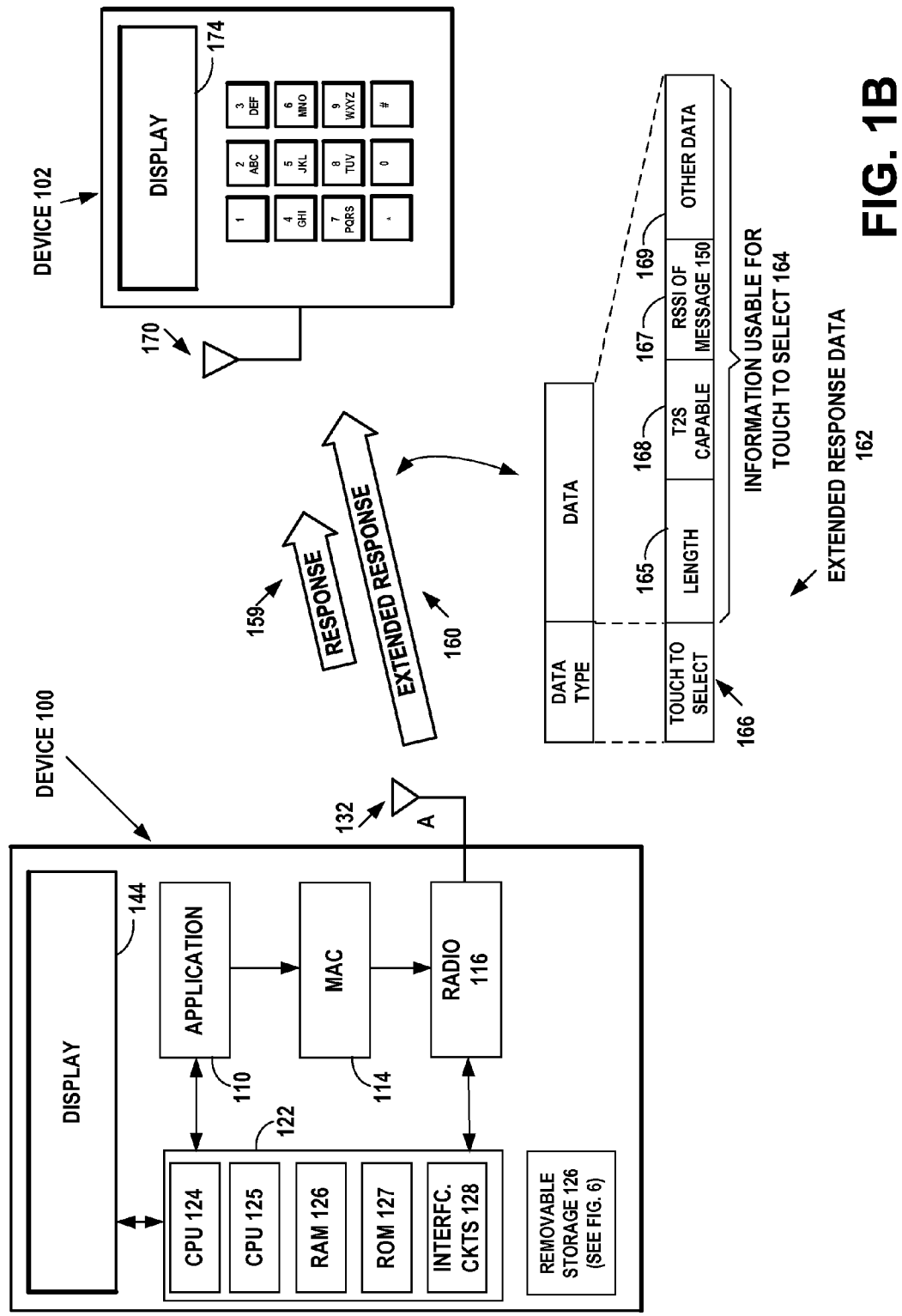
FIG. 1B is an illustration of an example embodiment of the invention, of the example network of FIG. 1A, wherein with the first device 100 has received one or more device detection messages from the second device 102 and in response, transmits one or more response messages including a first information message containing the information usable for estimating a touching or proximate distance to the wireless device, in accordance with at least one embodiment of the present invention.

FIG. 1B is an illustration of an example embodiment of the invention, of the example network of FIG. 1A, wherein with the first device 100 has received one or more device detection messages from the second device 102 and in response, transmits one or more response messages including a first information message containing the information usable for estimating a touching or proximate distance to the wireless device, in accordance with at least one embodiment of the present invention. The following is one example embodiment applied to Bluetooth technology.

FIG. 1B is an illustration of an example embodiment of the invention, of the example network of FIG. 1A, wherein with the first Bluetooth™ device, the inquiry scanning device 100, has received one or more inquiry messages 150 from the second Bluetooth™ device, the inquiring device 102. In an example embodiment of the invention, in response, the first Bluetooth™ device, the inquiry scanning device 100, transmits one or more response messages including a response packet 159, such as an FHS packet 159, that may be used by inquiring device 102 to estimate distance, and a first information message, the EIR packet 160, containing the information usable for estimating a touching or proximate distance to the wireless device 100, in accordance with at least one embodiment of the present invention. In an example embodiment of the invention, an RSSI value may be measured by the scanning device 100, for the inquiry packet 150 and reported to the inquiring device 102.

In accordance with an embodiment of the invention, an inquiry scanning device 100 that allows itself to be discovered, regularly enters the inquiry scan substate to respond to inquiry packets 150. The inquiry response is optional: a device is not forced to respond to an inquiry packet 150. During the inquiry substate, the inquiring device 102 collects the Bluetooth™ device addresses and clocks of all devices that respond to the inquiry packet 150. In addition, the inquiring device 102 also collects extended information (e.g. local name and supported services) from devices that respond with an extended inquiry response packet 160. In example embodiments of the invention, the extended inquiry response data 162 in the extended inquiry response packet 160 includes an indication 166, "Touch-to-Select" that is used to inform the inquiring device 102 about the existence and properties of the information usable for estimating a touching or proximate distance to the inquiry scanning device 100. In an example embodiment of the invention, the extended inquiry response data 162 in the extended inquiry response packet 160 may indicate merely the Touch-to-Select capability to receive reverse data, including touch-to-select type features. The extended inquiry response packet 160 may include a length field 165, a Touch-to-Select (T2S) capabilities field 168, an RSSI field 167, and other data 169. In an example embodiment of the invention, the inquiry scanning device 100 may measure the RSSI of the inquiry packet 150 and report the RSSI measurement information in field 167 of the extended inquiry response packet 160, reporting it to the inquiring device 102.

In accordance with an embodiment of the invention, the inquiring device 102, in response to receiving the extended inquiry response packet 160 including the first information message, may perform at least one of determining that the sender device 100 is in a touch-to-select or alternately a touch-to-send mode, measuring an RSSI value of the received message 160, determining an angle of arrival, determining inquiry parameters, and estimating distance to the sender device 100 using RSSI information included in the extended inquiry response packet 160.

Figure 1C:
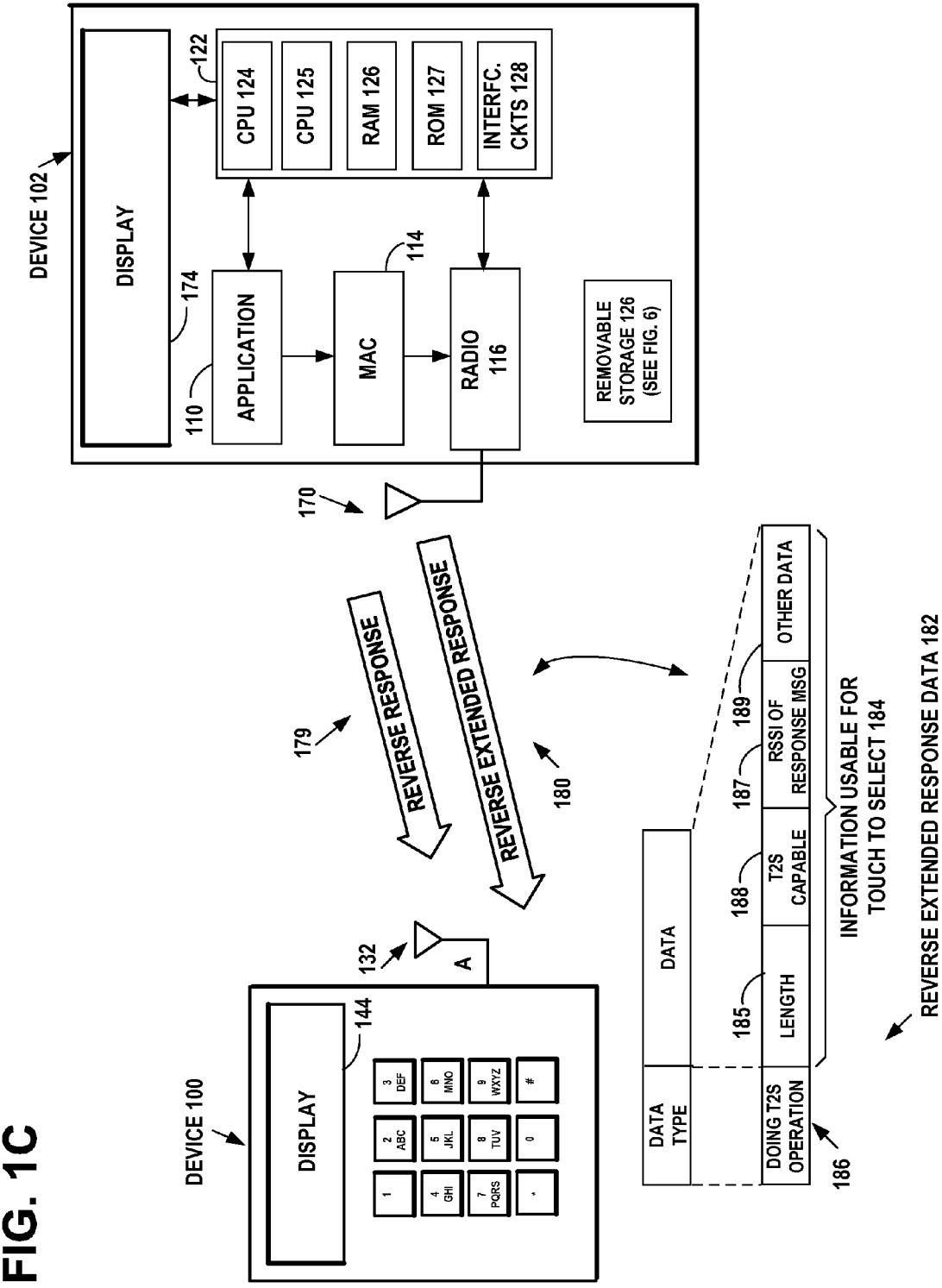
FIG. 1C is an illustration of an example embodiment of the invention, of the example network of FIG. 1B, wherein with the first device 100 receives a reverse response message including a second information message from the second device 102, containing second information usable for estimating a touching or proximate distance to the wireless device, in accordance with at least one embodiment of the present invention.

FIG. 1C is an illustration of an example embodiment of the invention, of the example network of FIG. 1B, wherein with the first device 100 receives a reverse response message including a second information message from the second device 102, containing second information usable for estimating a touching or proximate distance to the wireless device, in accordance with at least one embodiment of the present invention. The following is one example embodiment applied to Bluetooth technology.

FIG. 1C is an illustration of an example embodiment of the invention, of the example network of FIG. 1B, wherein with the first Bluetooth™ device, inquiry scanning device 100, receives a reverse response message including a second information message, the reverse response packet 179, such as the reverse FHS packet 179, and the reverse extended inquiry response packet 180, from the second Bluetooth™ device, the inquiring device 102. The reverse extended inquiry response packet 180 contains second information usable for estimating a touching or proximate distance to the inquiry scanning device 100, in accordance with at least one embodiment of the present invention. In embodiments of the invention, the extended inquiry response data 182 in the reverse extended inquiry response packet 180 includes an indication 186, "Doing Touch-to-Select Operation" that is used to inform the inquiry scanning device 100 about the existence and properties of the information usable for estimating a touching or proximate distance to the inquiring device 102. The reverse extended inquiry response packet 180 may include a length field 185, a Touch-to-Select (T2S) capabilities field 188, an RSSI field 187 containing the RSSI of the response message, and other data 169. In an example embodiment of the invention, the inquiring device 102 may measure the RSSI of either or both the FHS packet 159 and the EIR packet 160 and report the RSSI measurement information in field 187 of the reverse extended inquiry response packet 180, reporting it to the inquiry scanning device 100.

In accordance with an embodiment of the invention, in response to the inquiry scanning device 100 receiving the reverse response message including the reverse extended inquiry response packet 180, the inquiry scanning device 100 may perform at least one of initiating a faster inquiry scan interval, initiating a larger inquiry scan window, guiding user for touch-to-select functionality, activating a user interface to indicate proximity to the wireless device.

Bluetooth™ inquiring device 102 of FIG. 1C may have the same or similar components to those described for Bluetooth™ inquiry scanning device 100 of FIG. 1A.

In accordance with an example embodiment of the invention, FIG. 1A illustrates, from the point of view of the apparatus 100, receiving one or more device detection messages 150 at the apparatus 100.

In accordance with an example embodiment of the invention, FIG. 1B illustrates, from the point of view of the apparatus 100, transmitting, by the apparatus 100, one or more response messages 159 and/or 160 including information 162 usable for a wireless device 102 receiving the one or more response messages to estimate a distance to the apparatus 100.

In accordance with an example embodiment of the invention, FIG. 1C illustrates, from the point of view of the apparatus 100, receiving, at the apparatus 100, a reverse response message 179 and/or 180 including an information message 180 from the wireless device 102, containing information 182 usable for estimating a distance between the apparatus 100 and the wireless device 102.

In accordance with an example embodiment of the invention, FIG. 1A illustrates, from the point of view of the apparatus 102, transmitting, by the apparatus 102, wireless signals comprising one or more device detection messages 150.

In accordance with an example embodiment of the invention, FIG. 1B illustrates, from the point of view of the apparatus 102, receiving, by the apparatus 102, one or more response messages 159 and/or 160 from a wireless device 100, including information 162 usable by the apparatus 102 to estimate a distance to the wireless device 100.

In accordance with an example embodiment of the invention, FIG. 1C illustrates, from the point of view of the apparatus 102, transmitting, by the apparatus 102, a reverse response message 179 and/or 180 to the wireless device 100, including an information message 180 containing information 182 usable for estimating a distance between the wireless device 100 and the apparatus 102.

FIG. 2A is an illustration of an example embodiment of the invention, of the example timing during a device detection process, for example a Bluetooth inquiry process, in accordance with at least one embodiment of the present invention. The following is one example embodiment applied to Bluetooth technology.

FIG. 2A is an illustration of an example embodiment of the invention, of the example timing during the inquiry process, in accordance with at least one embodiment of the present invention. In the Bluetooth specification, during the inquiry procedure, the inquiring device or master device 102 transmits inquiry messages 150 with the general or dedicated inquiry access code. An inquiry response packet (FHS) 159 is transmitted from the inquiry scanning device or slave 100 to the master 102 after the slave has received the inquiry message 150. The device discovery is specified so that the discoverable inquiry scanning device 100 is doing inquiry scan and the inquiring device 102 doing device discovery is in the inquiry state. This means that the inquiring device 102 in inquiry state sends inquiry packets (ID packets) 150, as shown in FIG. 1A, and the discoverable inquiry scanning device 100 scans periodically whether it receives any of the transmitted inquiry packets 150 and responds to those with FHS packets 159, as shown in FIG. 1B. In addition, the discoverable inquiry scanning device 100 may send an Extended Inquiry Response (EIR) packet 160 after the FHS packet 159, as shown in FIG. 1B, to deliver more information about the inquiry scanning device 100. The EIR packet 160 may include for example name of the inquiry scanning device 100 or transmission power. The timing of the inquiry process is shown in FIG. 2A.

If the inquiry scanning device 100 transmits an extended inquiry response packet 160, it is transmitted 1250 microseconds after the start of the inquiry response FHS packet 159. The extended inquiry response packet 160 is received by the inquiring device 102 at the hop frequency when the inquiry message received by the inquiry scanning device 100 was first in the master-to-slave slot. The extended inquiry response packet is an Asynchronous Connection-oriented Logical transport (ACL) packet with type DM1, DM3, DM5, DH1, DH3 or DH5.

Figure 2B:
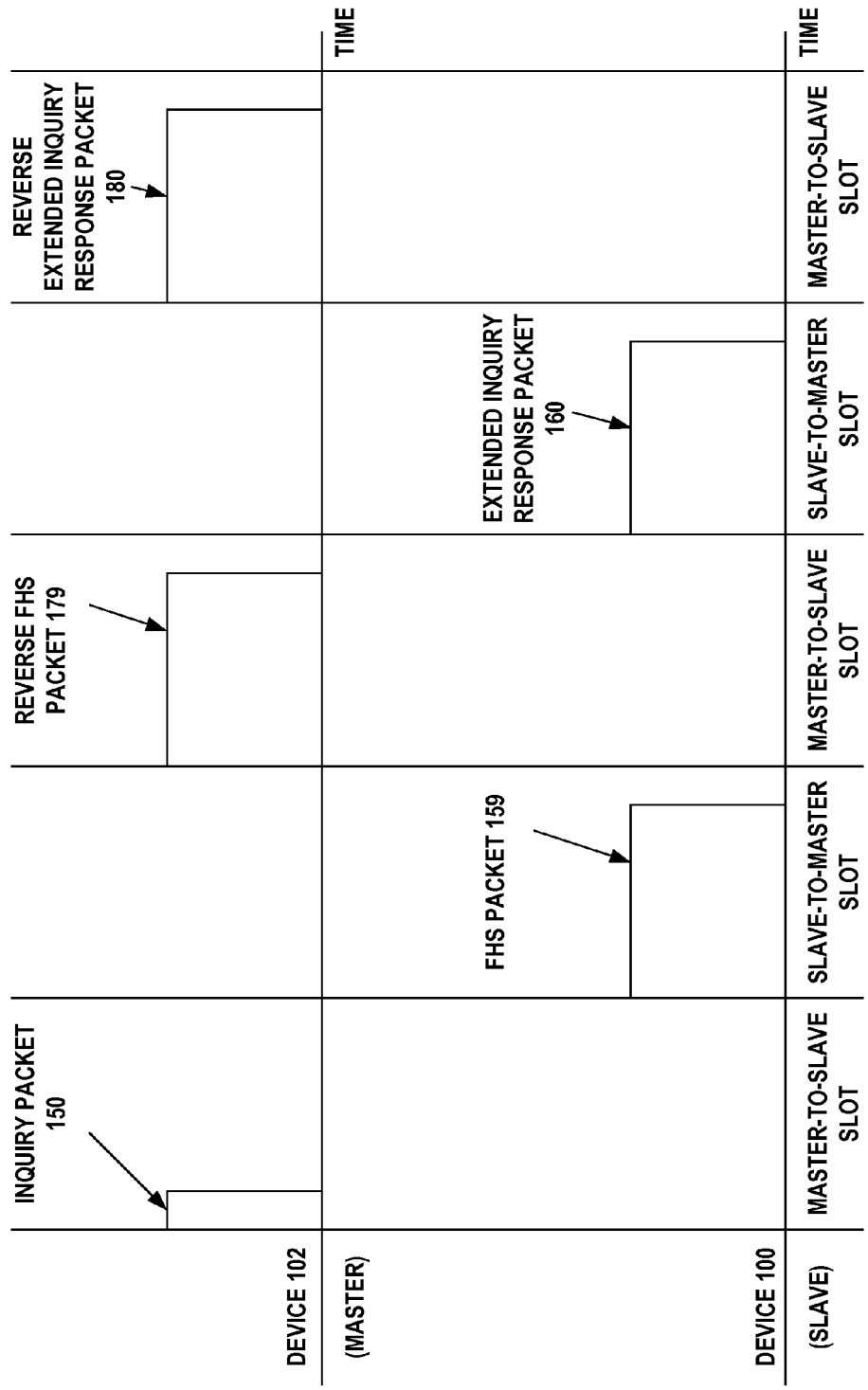
FIG. 2B is an illustration of an example embodiment of the invention, of the example timing during the bidirectional response operation, for example as applied in Bluetooth technology, in accordance with at least one embodiment of the present invention.

FIG. 2B is an illustration of an example embodiment of the invention, of the example timing during the bidirectional response operation, for example as applied in Bluetooth technology, in accordance with at least one embodiment of the present invention. The following is one example embodiment applied to Bluetooth technology.

FIG. 2B is an illustration of an example embodiment of the invention, of the example timing during the bidirectional response operation, in accordance with at least one embodiment of the present invention. The "Reverse Data Transfer during Inquiry" feature is an optional message, the reverse extended inquiry response packet 180 of FIG. 1C, delivered by the inquiring device 102 to the inquiry scanning device 100, in response to an Extended Inquiry Response (EIR) message 160 of FIG. 1B. This allows an inquiring device 102 to provide information to the inquiry scanning device 100 without forming an ACL connection. Different types of information may be provided in the message with the following examples:

Short application specific data
inquiring device 102 BD address
inquiring device 102 attributes (Reverse EIR)

A benefit of this feature is to allow the delivery of short application messages to an inquiry scanning device 100 by an inquiring device 102, without requiring an ACL connection setup. This is important in situations where many devices are attempting to identify an inquiring device 102 with a specific service via an inquiry/EIR sequence and then deliver a short message to that device. With this enhancement, the inquiry scanning device 100 only needs to perform inquiry scans instead of both inquiry and page scans.

If the inquiring device 102 transmits a reverse FHS packet 179, it is transmitted in the next master-to-slave slot following the FHS packet 159 received from the inquiry scanning device 100. If the inquiring device 102 transmits a reverse extended inquiry response packet 180, it is transmitted in the next master-to-slave slot following the extended inquiry response packet 160 received from the inquiry scanning device 100. The reverse extended inquiry response packet 180 is an Asynchronous Connection-oriented Logical transport (ACL) packet with type DM1, DM3, DM5, DH1, DH3 or DH5.

FIG. 3 is an illustration of an example embodiment of the invention, illustrating a reverse extended response packet transmitted from device 102, for example as applied in a modified Bluetooth extended inquiry response, in accordance with at least one embodiment of the present invention. The following is one example embodiment applied to Bluetooth technology.

FIG. 3 is an illustration of an example embodiment of the invention, of the example reverse extended inquiry response from inquiring device 102, as shown in FIG. 1C, in accordance with at least one embodiment of the present invention. In embodiments of the invention, the extended inquiry response data 182 in the reverse extended inquiry response packet 180, includes an indication 186, "Doing Touch-to-Select Operation" that is used to inform the inquiry scanning device 100 about the existence and properties of the information usable for estimating a touching or proximate distance to the inquiring device 102. The reverse extended inquiry response packet 180 may include a length field 185, a Touch-to-Select (T2S) capabilities field 188, an RSSI field 187 containing the RSSI of the response message, and other data 169.

Figure 4:
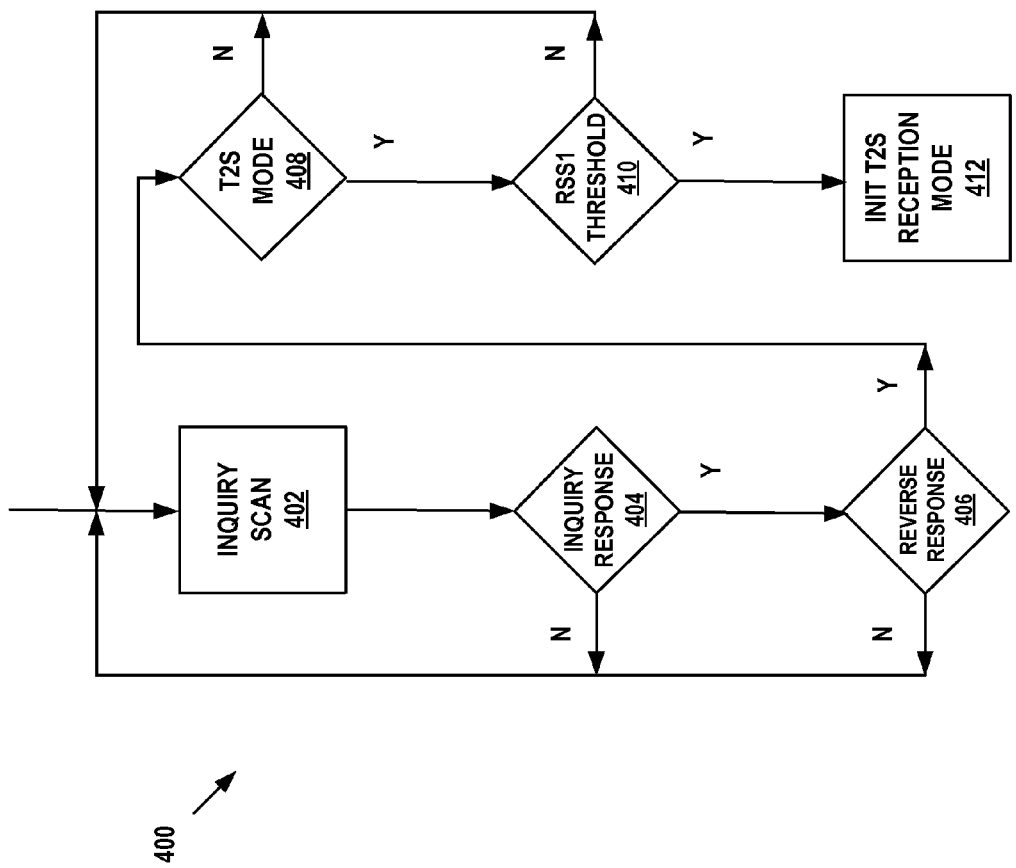
FIG. 4 is an illustration of an example embodiment of the invention, of the example flow diagram of the reception mode, in accordance with at least one embodiment of the present invention.

FIG. 4 is an illustration of an example embodiment of the invention, of the example flow diagram of the reception mode, in accordance with at least one embodiment of the present invention. The following is one example embodiment applied to Bluetooth technology.

FIG. 4 is an illustration of an example embodiment of the invention, of the example flow diagram 400 of the reception mode, in accordance with at least one embodiment of the present invention. In step 402, the first Bluetooth™ device, inquiry scanning device 100, is scanning for one or more inquiry messages from a second Bluetooth™ device, inquiring device 102. In step 404, if the first Bluetooth™ device, inquiry scanning device 100, has received one or more inquiry messages 150 from the second Bluetooth™ device, as shown in FIG. 1A, inquiring device 102, then in response, inquiry scanning device 100 transmits one or more response messages, FHS packet 159 and EIR packet 160 of FIG. 1B, including a first information message containing the information usable for estimating a touching or proximate distance to the wireless device. Then, in step 406, if the first Bluetooth™ device, inquiry scanning device 100, receives a reverse response message, the reverse EIR packet 180 of FIG. 1C, including a second information message from the second Bluetooth™ device, inquiring device 102, containing second information usable for estimating a touching distance to the wireless device, then in step 408, the Touch-to-Select mode is entered. The RSSI is measured by the inquiry scanning device 100 and in step 410, is compared with a threshold value and if the RSSI is larger than the threshold value, then in step 412, the inquiry scanning device 100 enters the Touch-to-Select reception mode. The Touch-to-Select (T2S) technique that uses Bluetooth inquiry for the device discovery and RSSI level event reporting for discovered devices to enable selecting a device that is estimated to be in the touch distance from the inquiring device. With T2S, the device that is "touched", i.e. brought in the close vicinity of the inquiring device, may be selected for enabling, for example, the picture/media file sharing operation. Similar features also may be designed for other local connectivity technologies, such as WLAN.

FIG. 5A is an illustration of an example embodiment of the invention, of the example process in the device 100 in accordance with at least one embodiment of the present invention. The steps of the flow diagram 500 represent computer code instructions stored in the RAM and/or ROM memory of the device 100, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 502: receiving one or more device detection messages at an apparatus;

Step 504: transmitting, by the apparatus, one or more response messages including information usable for a wireless device receiving the one or more response messages to estimate a distance to the apparatus; and Step 506: receiving, at the apparatus, a reverse response message including an information message from the wireless device, containing information usable for estimating a distance between the apparatus and the wireless device.

FIG. 5B is an illustration of an example embodiment of the invention, of an example process in the device 100 in accordance with at least one embodiment of the present invention. The steps of the flow diagram 500' represent computer code instructions stored in the RAM and/or ROM memory of the device 100, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 502: receiving one or more device detection messages at an apparatus;

Step 504: transmitting, by the apparatus, one or more response messages including information usable for a wireless device receiving the one or more response messages to estimate a distance to the apparatus; and Step 506: receiving, at the apparatus, a reverse response message including an information message from the wireless device, containing information usable for estimating a distance between the apparatus and the wireless device.

Step 508: estimating, by the apparatus, a distance to the wireless device using the information usable for estimating the distance to the wireless device included in the reverse response message.

Step 510: comparing, by the apparatus, the estimated distance with distance estimation information included in the information message to determine whether the apparatus and the wireless device share same view on estimated distance between the apparatus and the wireless device.

Step 512: initiating, by the apparatus, a short-range communication connection with the wireless device in response to determination that both the apparatus and the wireless device consider being within close proximity to each other.

The distance estimation information included in the information message includes at least one of a RSSI information corresponding the estimated distance between the apparatus and the wireless device and an indication that the apparatus and the wireless device are in close proximity with each other.

Figure 5C:
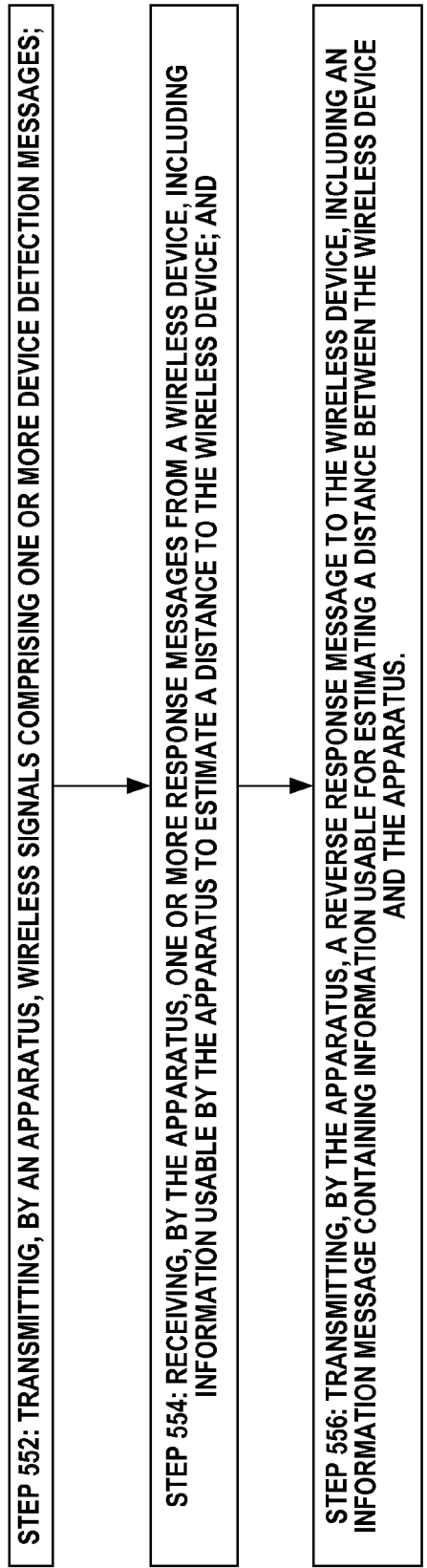
FIG. 5C is an illustration of an example embodiment of the invention, of the example process in the device 102, in accordance with at least one embodiment of the present invention.

FIG. 5C is an illustration of an example embodiment of the invention, of the example process in the device 102, in accordance with at least one embodiment of the present invention. The steps of the flow diagram 550 represent computer code instructions stored in the RAM and/or ROM memory of the device 102, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 552: transmitting, by an apparatus, wireless signals comprising one or more device detection messages;

Step 554: receiving, by the apparatus, one or more response messages from a wireless device, including information usable by the apparatus to estimate a distance to the wireless device; and Step 556: transmitting, by the apparatus, a reverse response message to the wireless device, including an information message containing information usable for estimating a distance between the wireless device and the apparatus.

FIG. 5D is an illustration of an example embodiment of the invention, of the example process in the device 102, in accordance with at least one embodiment of the present invention. The steps of the flow diagram 550' represent computer code instructions stored in the RAM and/or ROM memory of the device 102, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 552: transmitting, by an apparatus, wireless signals comprising one or more device detection messages;

Step 554: receiving, by the apparatus, one or more response messages from a wireless device, including information usable by the apparatus to estimate a distance to the wireless device; and Step 556: transmitting, by the apparatus, a reverse response message to the wireless device, including an information message containing information usable for estimating a distance between the wireless device and the apparatus.

Step 558: estimating, by the apparatus, a distance to the wireless device using the information usable for estimating the distance to the wireless device included in the one or more response messages.

Step 510: comparing, by the apparatus, the estimated distance with distance estimation information included in the one or more response messages to determine whether the apparatus and the wireless device share same view on estimated distance between the apparatus and the wireless device.

Step 512: initiating, by the apparatus, a short-range communication connection with the wireless device in response to determination that both the apparatus and the wireless device consider being within close proximity to each other.

The distance estimation information included in the one or more response messages includes at least one of a RSSI information corresponding the estimated distance between the apparatus and the wireless device and an indication that the apparatus and the wireless device are in close proximity with each other.

Figure 6:
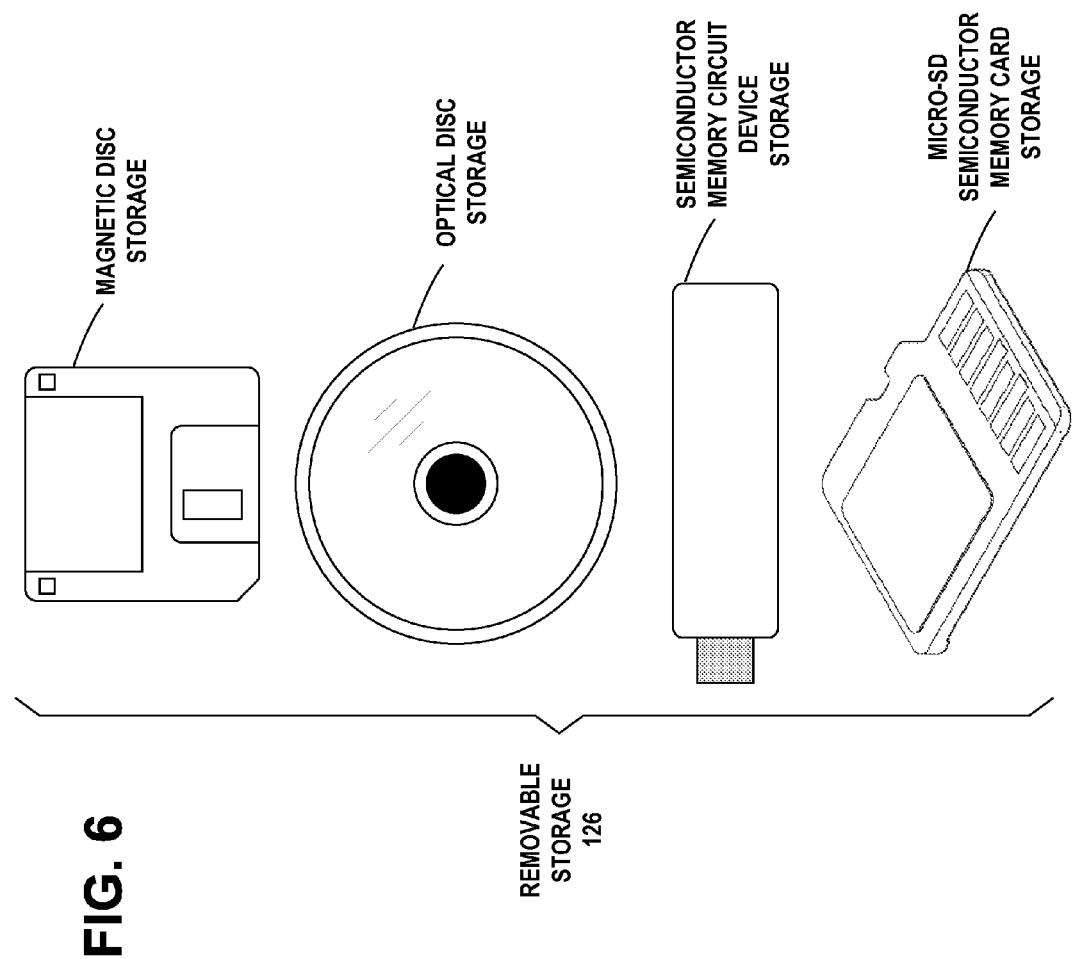
FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Figure 7:
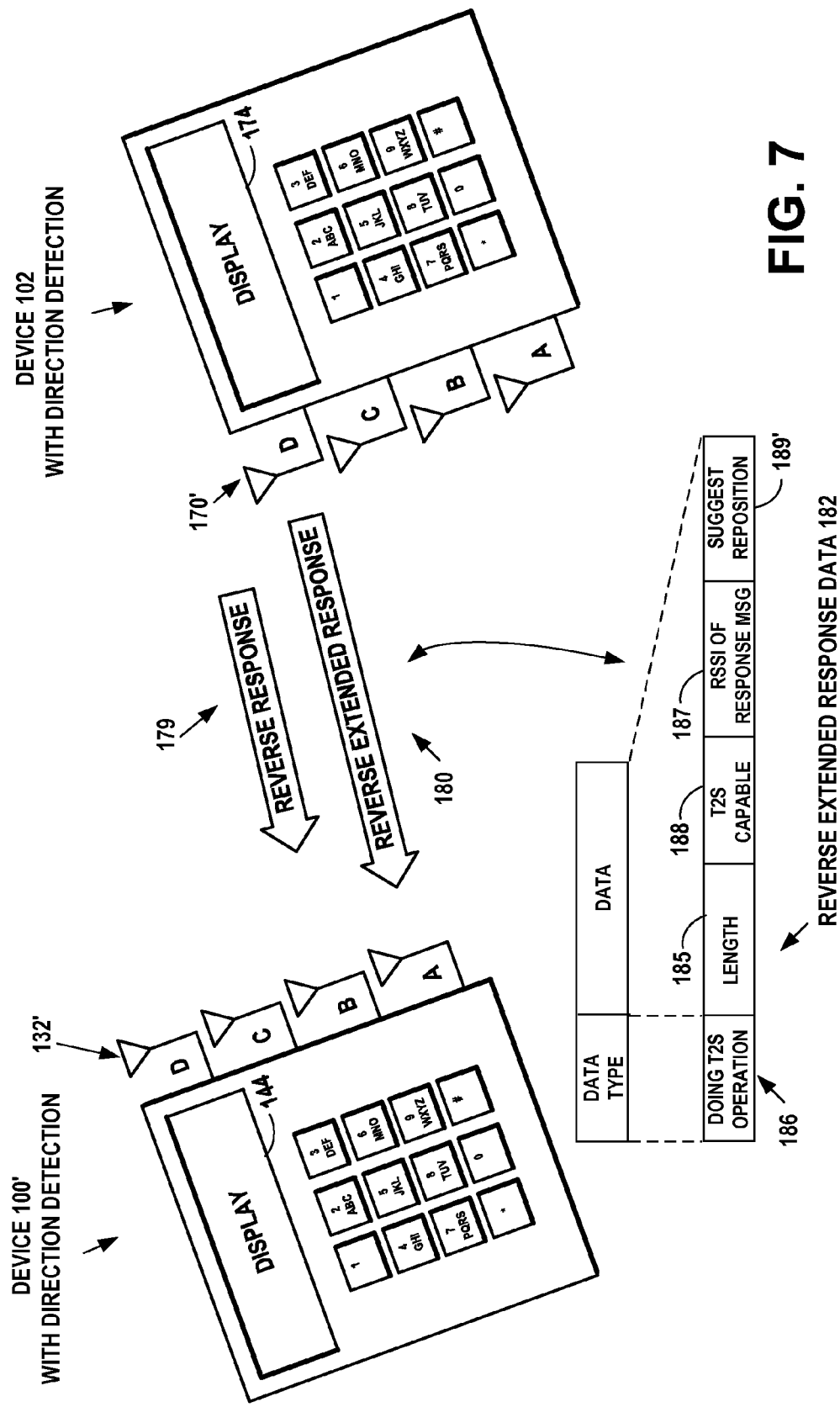
FIG. 7 is an illustration of an example alternate embodiment of the invention, of the example network of FIG. 1B, wherein with the first device 100' is oriented at an arbitrary angle from the second device 102', and the first device 100' receives a reverse response message including a second information message from the second device 102', containing information usable for indicating an angle of arrival, to enable a user of the first device 100' to reposition the device to improve reception, in accordance with at least one embodiment of the present invention.

FIG. 7 is an illustration of an example alternate embodiment of the invention, of the example network of FIG. 1B, wherein with the first device 100' is oriented at an arbitrary angle from the second device 102', and the first device 100' receives a reverse response message including a second information message from the second device 102', containing information usable for indicating an angle of arrival, to enable a user of the first device 100' to reposition the device to improve reception, in accordance with at least one embodiment of the present invention. The following is one example embodiment applied to Bluetooth technology.

FIG. 7 is an illustration of an example alternate embodiment of the invention, of the example network of FIG. 1B, wherein with the first Bluetooth™ device 100' is oriented at an arbitrary angle from the second Bluetooth™ device 102', and the first Bluetooth™ device 100' receives a reverse response message including a second information message 180 from the second Bluetooth™ device 102, containing information usable for indicating an angle of arrival, to enable a user of the first Bluetooth™ device 100' to reposition the device 100' to improve reception, in accordance with at least one embodiment of the present invention.

Direction estimation of the signal source from the received signal may be based on multiple antennas. The estimation of the angle of arrival is based on time difference of signal copies received by multiple, spatially separated antennas, and the time difference is due to variable propagation channel lengths, and the practical estimation is typically based on secondary effects to the signal, such as the resulting phase difference of the signal copies. The direction finding may be performed with tightly integrated multi-antenna modules placed appropriately on a mobile device, performing very fast antenna switching during a known reference signal. Effectively, if the signal phase change is known a priori based on a known signal, the signal phase differences obtained from different antennas may be used to estimate the direction of arrival of the signal. This approach enables direction finding for small devices and enables new applications using the directional information.

A direction estimation technique for small devices is described in the copending U.S. patent application Ser. No. 13/081,583, filed Apr. 7, 2011, entitled "Method, Apparatus, and Computer Program Product for Special Dedicated Inquiry and Inquiry Response Process For Dedicated Device Search", the disclosure of which is incorporated herein by reference. As described in the copending U.S. patent application Ser. No. 13/081,583, a Bluetooth inquiry scanning device responds to an inquiry packet from a Bluetooth inquiring device, by generating and transmitting the information usable for estimating at least a relative direction. The inquiring device will use the received information usable for estimating at least a relative direction, for direction estimation. If the inquiry scanning device has one or more antennas for transmitting the information usable for estimating at least a relative direction and the inquiring device has an antenna array for receiving the information usable for estimating at least a relative direction, then the receiving, inquiring device will estimate the angle of arrival (AoA) with respect to itself. Alternately, if the Bluetooth inquiry scanning device has an antenna array to transmit the information usable for estimating at least a relative direction and the Bluetooth inquiring device has one or more antennas to receive the information usable for estimating at least a relative direction, then the receiving, inquiring device will estimate the angle of departure (AoD) with respect to the transmitter.

The first Bluetooth™ device 100' of FIG. 7 is oriented at an arbitrary angle from the second Bluetooth™ device 102'. In accordance with an example embodiment of the invention, the first Bluetooth™ device 100' receives a reverse response message including a second information message 180 from the second Bluetooth™ device 102, containing information usable for indicating an angle of arrival, to enable a user of the first Bluetooth™ device 100' to reposition the device 100' to improve reception, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   receiving one or more device detection messages at an apparatus;
   transmitting, by the apparatus, one or more response messages including information usable for a wireless device receiving the one or more response messages to estimate a distance to the apparatus; and receiving, at the apparatus, a reverse response message including an information message from the wireless device, containing information usable for estimating a distance between the apparatus and the wireless device.

2. The method of claim 1, wherein the information message includes a value that signifies that the wireless device sending the information message is capable of receiving and using the information usable for estimating the distance to the apparatus.

3. The method of claim 1, further comprising:
estimating, by the apparatus, a distance to the wireless device using the information usable for estimating the distance to the wireless device included in the reverse response message.

4. The method of claim 3, further comprising:
comparing, by the apparatus, the estimated distance with distance estimation information included in the information message to determine whether the apparatus and the wireless device share same view on estimated distance between the apparatus and the wireless device.

5. The method of claim 4, wherein the distance estimation information included in the information message includes at least one of a RSSI information corresponding the estimated distance between the apparatus and the wireless device and an indication that the apparatus and the wireless device are in close proximity with each other.

6. The method of claim 4, further comprising:
initiating, by the apparatus, a short-range communication connection with the wireless device in response to determination that both the apparatus and the wireless device consider being within close proximity to each other.

7. A method, comprising:
transmitting, by an apparatus, wireless signals comprising one or more device detection messages;
receiving, by the apparatus, one or more response messages from a wireless device, including information usable by the apparatus to estimate a distance to the wireless device; and
transmitting, by the apparatus, a reverse response message to the wireless device, including an information message containing information usable for estimating a distance between the wireless device and the apparatus.

8. The method of claim 7, wherein the information message includes a value that signifies that the apparatus is capable of receiving and using the information usable for estimating the distance to the apparatus.

9. The method of claim 7, further comprising:
estimating, by the apparatus, a distance to the wireless device using the information usable for estimating the distance to the wireless device included in the one or more response messages.

10. The method of claim 9, further comprising:
comparing, by the apparatus, the estimated distance with distance estimation information included in the one or more response messages to determine whether the apparatus and the wireless device share same view on estimated distance between the apparatus and the wireless device.

11. The method of claim 10, further comprising:
initiating, by the apparatus, a short-range communication connection with the wireless device in response to determination that both the apparatus and the wireless device consider being within close proximity to each other.

12. An apparatus, comprising:
at least one processor;
at least one memory including computer program code;
the at least one memory and the computer program code configured to, with the at least one processor, cause the apparatus at least to:
receive one or more device detection messages;
transmit one or more response messages including information usable for a wireless device receiving the one or more response messages to estimate a distance to the apparatus; and
receive a reverse response message including an information message from the wireless device, containing information usable for estimating a distance between the apparatus and the wireless device.

13. The apparatus of claim 12, wherein the information message includes a value that signifies that the wireless device sending the information message is capable of receiving and using the information usable for estimating the distance to the apparatus.

14. The apparatus of claim 12, further comprising:
the at least one memory and the computer program code configured to, with the at least one processor, cause the apparatus at least to:
estimate a distance to the wireless device using the information usable for estimating the distance to the wireless device included in the reverse response message.

15. The apparatus of claim 14, further comprising:
the at least one memory and the computer program code configured to, with the at least one processor, cause the apparatus at least to:
compare the estimated distance with distance estimation information included in the information message to determine whether the apparatus and the wireless device share same view on estimated distance between the apparatus and the wireless device.

16. The apparatus of claim 15, wherein the distance estimation information included in the information message includes at least one of a RSSI information corresponding the estimated distance between the apparatus and the wireless device and an indication that the apparatus and the wireless device are in close proximity with each other.

17. The apparatus of claim 15, further comprising:
the at least one memory and the computer program code configured to, with the at least one processor, cause the apparatus at least to:
initiate a short-range communication connection with the wireless device in response to determination that both the apparatus and the wireless device consider being within close proximity to each other.

18. An apparatus, comprising:
at least one processor;
at least one memory including computer program code;
the at least one memory and the computer program code configured to, with the at least one processor, cause the apparatus at least to:
transmit wireless signals comprising one or more device detection messages;
receive one or more response messages from a wireless device, including information usable by the apparatus to estimate a distance to the wireless device; and
transmit a reverse response message to the wireless device, including an information message containing information usable for estimating a distance between the wireless device and the apparatus.

19. The apparatus of claim 18, wherein the information message includes a value that signifies that the apparatus is capable of receiving and using the information usable for estimating the distance to the apparatus.

20. The apparatus of claim 18, further comprising:
the at least one memory and the computer program code configured to, with the at least one processor, cause the apparatus at least to:
estimate a distance to the wireless device using the information usable for estimating the distance to the wireless device included in the one or more response messages.

21. The apparatus of claim 20, further comprising:
the at least one memory and the computer program code configured to, with the at least one processor, cause the apparatus at least to:
compare the estimated distance with distance estimation information included in the one or more response messages to determine whether the apparatus and the wireless device share same view on estimated distance between the apparatus and the wireless device.

22. The apparatus of claim 21, further comprising:
the at least one memory and the computer program code configured to, with the at least one processor, cause the apparatus at least to:
initiate a short-range communication connection with the wireless device in response to determination that both the apparatus and the wireless device consider being within close proximity to each other.

23. A computer program product comprising computer executable program code recorded on a computer readable, non-transitory storage medium, the computer executable program code comprising:

code for receiving one or more device detection messages at an apparatus;

code for transmitting, by the apparatus, one or more response messages including information usable for a wireless device receiving the one or more response messages to estimate a distance to the apparatus; and code for receiving, at the apparatus, a reverse response message including an information message from the wireless device, containing information usable for estimating a distance between the apparatus and the wireless device.

24. A computer program product comprising computer executable program code recorded on a computer readable, non-transitory storage medium, the computer executable program code comprising:

code for transmitting, by an apparatus, wireless signals comprising one or more device detection messages;

code for receiving, by the apparatus, one or more response messages from a wireless device, including information usable by the apparatus to estimate a distance to the wireless device; and code for transmitting, by the apparatus, a reverse response message to the wireless device, including an information message containing information usable for estimating a distance between the wireless device and the apparatus.

* * * * *